United States Patent [19]

Harris

[11] 3,756,670

[45] Sept. 4, 1973

[54] MOTORIZED RACK AND PINION ACTUATED TRACK MOUNTED TOOL CARRIAGE

[75] Inventor: Michael Faulkner Harris, Willowdale, Ontario, Canada

[73] Assignee: Gulley Company Limited, Scarborough, Ontario, Canada

[22] Filed: Apr. 28, 1971

[21] Appl. No.: 138,184

[52] U.S. Cl.................... 308/6 R, 83/635, 104/246, 105/29 R, 173/32, 228/29, 219/125
[51] Int. Cl.... B23k 37/02, F16c 21/00, F16c 29/12
[58] Field of Search...................... 83/635; 104/119, 104/246, 247; 105/29 R, 30, 141, 144, 145; 173/32; 219/125; 266/23 K, 23 M; 228/29; 308/6 R

[56] References Cited
UNITED STATES PATENTS

| | | | |
|---|---|---|---|
| 3,485,306 | 12/1969 | Gulley | 173/32 |
| 2,598,251 | 5/1952 | Gesner | 308/6 R |
| 2,265,086 | 12/1941 | Spiro | 308/6 R X |
| 2,602,710 | 7/1952 | Gesner | 308/6 R |
| 2,992,620 | 7/1961 | Cherkas | 104/119 |

*Primary Examiner*—Gerald M. Forlenza
*Assistant Examiner*—Howard Beltran
*Attorney*—Cecil C. Kent

[57] ABSTRACT

Tool-carrying track-confined and guided vehicles have running gear including roller assemblies of which those on one side may be so moved relative to those on other side as to effect release for removal of the vehicle from the track. The moveable roller assemblies are journalled for swivelling in opposite ends of a horizontal beam connected to the vehicle underside for limited rotation about a central vertical post and for transverse spatial adjustment. Gear transversely shiftable provides optimum loading on all roller assemblies.

14 Claims, 5 Drawing Figures

PATENTED SEP 4 1973 3,756,670
SHEET 1 OF 2
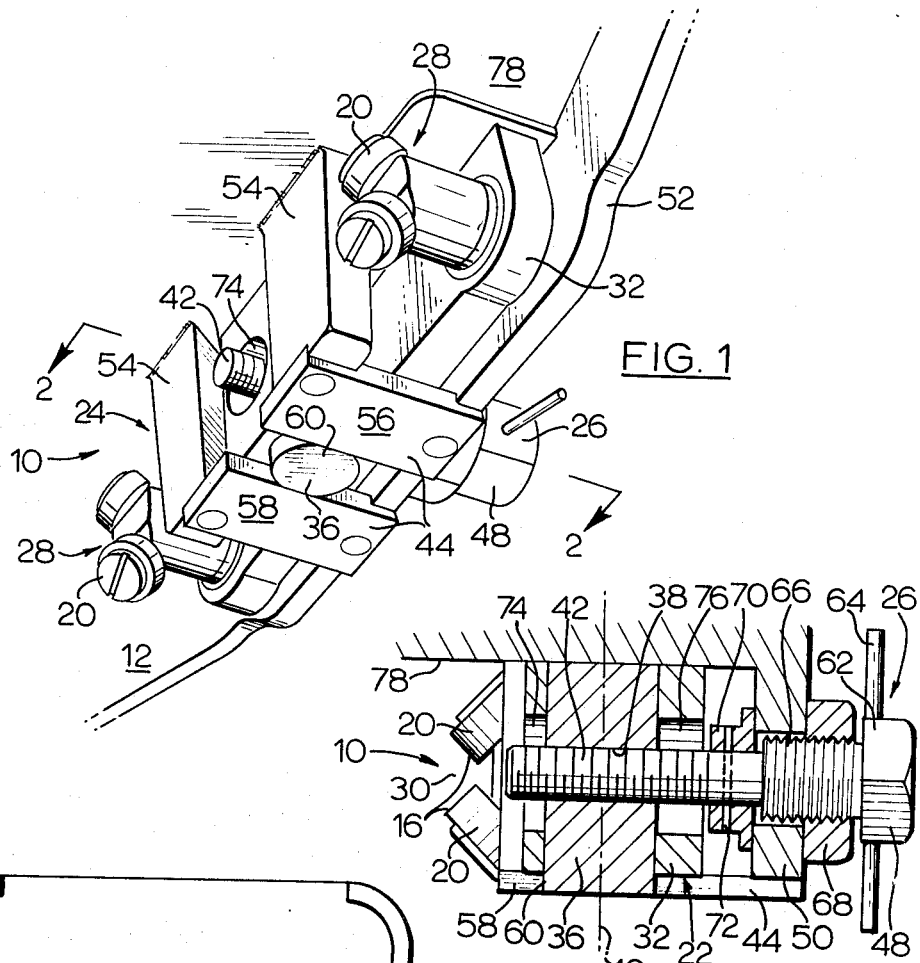
FIG. 1
FIG. 2
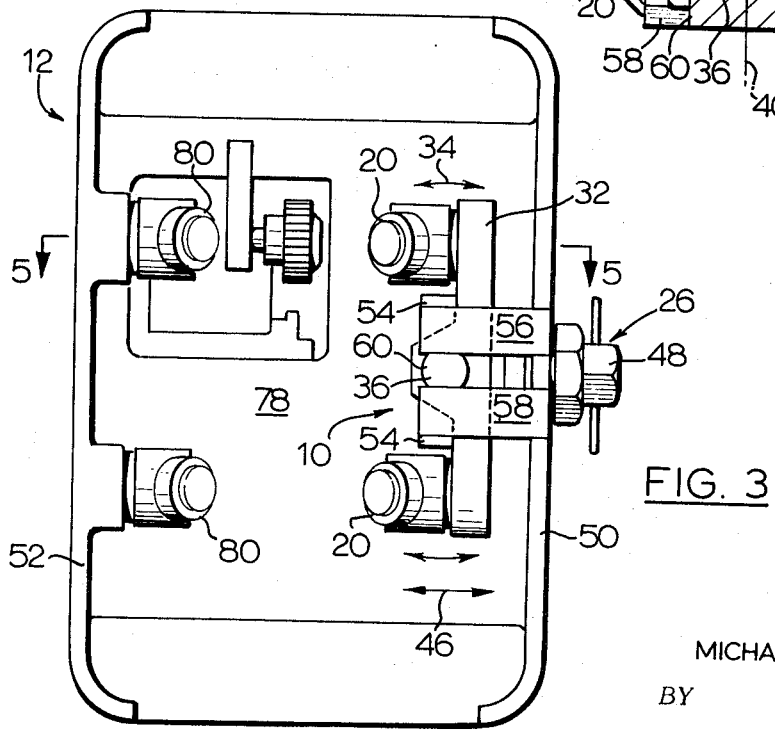
FIG. 3
INVENTOR.
MICHAEL FAULKNER HARRIS
BY

INVENTOR.
MICHAEL FAULKNER HARRIS

MOTORIZED RACK AND PINION ACTUATED TRACK MOUNTED TOOL CARRIAGE

FIELD OF THE INVENTION

This invention relates to a means for releasably locking a carriage to a length of track via rollers on the carriage and while continuing to permit the carriage to travel via said rollers upon said track. The form of carriage mainly contemplated is of the various forms employed for carrying a welding or cutting tool. The track contemplated is of extruded aluminum or the like wherein the roller carrying portions are on opposite edges and parallel, the track being of unit construction and adapted to be secured as by magnet means or otherwise to various conformations of platework to be cut, welded, or otherwise worked upon.

DESCRIPTION OF THE PRIOR ART

The present invention particularly constitutes an improvement over the invention disclosed in U.S. Pat. No. 3,485,306 to J.M. Gulley dated Dec. 23, 1969. In that patent, in FIG. 1 thereof is shown a carriage of the form contemplated, and a length of track of the form contemplated. In FIGS. 10 through 15 of said patent may be seen the particular manner in which the carriage is locked to and may be unlocked from the associated track of which the present invention is an improvement.

The disadvantages of the arrangements illustrated in FIG. 10 through 15 of the said patent and the advantages of the arrangements for the same general purpose set forth herein are summarized as follows:

1. The vertical post, pin or pivot-point about which the beam rotates horizontally to a limited extent with a swivelling roller assembly upon each end thereof compensates for any slight difference which might exist or develop in the diameter of any roller or in wear of the bearing of any roller with the result that optimum loading exists at all times on all four wheel assemblies, which wheel assemblies are all at all times in contact with the associated track bearing surfaces when the invented clamping assembly is in locking position. This is in contrast to the situation which can obtain by the use of the gate 58 in the said patent. With that arrangement, the stub-shafts of the roller assemblies 50 might vary very slightly as to length. The rollers might wear, or the bearings of the same might wear. The gate might not lock down in proper end bearing relationship with the adjacent stub-shaft. In any of such cases there would not be automatic compensation such as to provide optimum loading on all four assemblies. By contrast chattering for excample could develop and a gradually magnifying decrease in efficiency.

2. The carriage may frequently be crawling horizontally along a vertical surface. It may be heavily loaded with a cutting or welding tool and by the drag of cable so associated therewith. In the case of the patented carriage, if the gate 58 under such circumstances be on the upper side, the end-thrust of the adjustable or longer stub-shaft 54 against the gate (which is only locked to the associated rocker midway of its length) is sufficient to cause distortion about one or both gate-ends relative to the locked-down-mid point of the gate.

Such distortion cannot so easily occur with the arrangements disclosed herein due to the tendency of the beam to assist in even load distribution on both the roller assemblies attached to the ends thereof.

3. A further disadvantage of the patented roller-locking arrangements well illustrated by reference to FIG. 11 thereof lies in the bending moment on the unsupported inwardly-extended portions of the left-hand stub-shafts 54 which carry the transversely moveable roller pairs (see also FIG. 12). No corresponding bending moment can take place with the clamping assembly herein partly due of course to the fact that there is no longer any unsupported stub-shaft portion, besides which torsion due to the weight of a loaded carriage travelling horizontally, upon the swivelling roller pairs is eliminated by the herein arrangement of hangers preferably cast solid with the carriage-underside, and the pair of spaced and parallel stiffening and guide means which bridge the lower ends of the said hangers and the adjacent rocker flange.

With the foregoing in view and such further or other purposes, advantages or novel features as may become apparent from consideration of this disclosure and specification, the present invention consists of the inventive concept which is comprised, embodied, embraced, or included in the method, process, construction, composition, arrangement or combination of parts, or new use of any of the foregoing, herein exemplified in one or more specific embodiments of such concept, reference being had to the accompanying drawings in which:

FIG. 1 is an underside perspective representation of the wheel or roller clamping assembly constituting the present invention and showing the wheel or roller advancing and retracting assembly in a condition of partial retraction.

FIG. 2 is an enlarged section on the line 2-2 of FIG. 1 but depicting the wheel or roller advancing the retracting assembly in a condition of somewhat greater advance.

FIG. 3 is an underside plan view of a carriage equipped with the present invention showing the wheel or roller advancing and retracting assembly in a condition of substantially maximum advance.

Like characters of reference designate similar parts in the several Figures.

PRELIMINARY DEFINITIONAL DESCRIPTION

Figure 4:
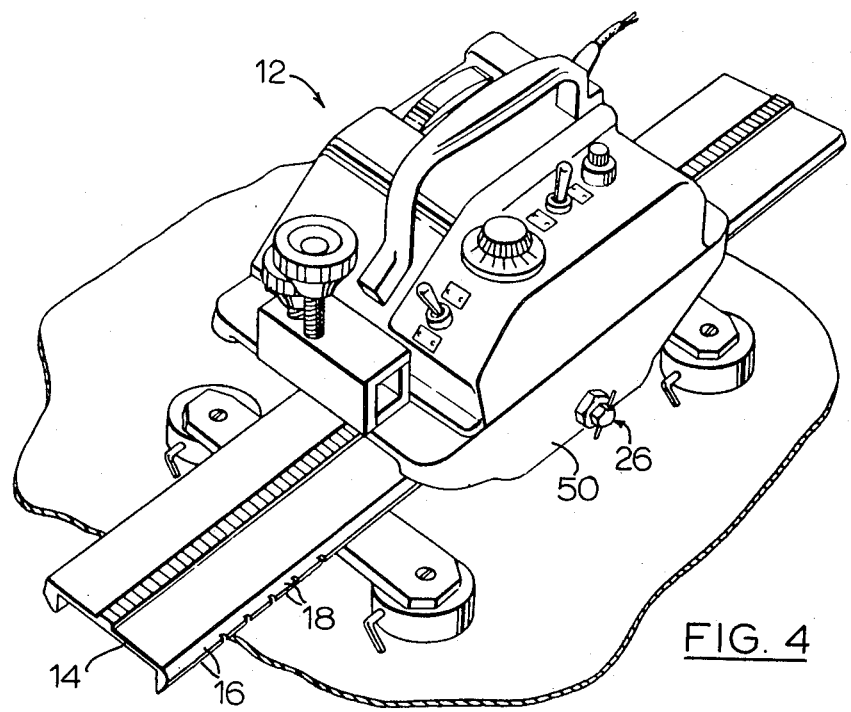
FIG. 4 is a perspective representation of a tool holding carriage such as that with which the invention of FIG. 1 through 3 hereof may be equipped, the carriage shown mounted upon a stretch of track means which in turn is magnetically held to a piece of work.

Initially describing the subject matter hereof in terms generally consonant with those by which the same has been defined and claimed as an invention, the wheel or roller clamping assembly generally designated by the reference numeral 10 is for use in combination with vehicle 12, track means 14, and restricting means 16 (for confining said vehicle to the vehicle-contacting portions 18 of said track means), and transversely variably spaced wheel or roller means 20 which are rollably and lockably engageable with track means 14, said clamping assembly comprising in combination a two-point load-balancing roller-to-track locking and releasing means 22 moveable towards or away from said contacting portions, a mounting assembly 24 in which said locking and releasing means may be moved, and manually operable means 26 for moving said locking and releasing means towards or away from said vehicle contacting portions of said track means.

Figure 5:
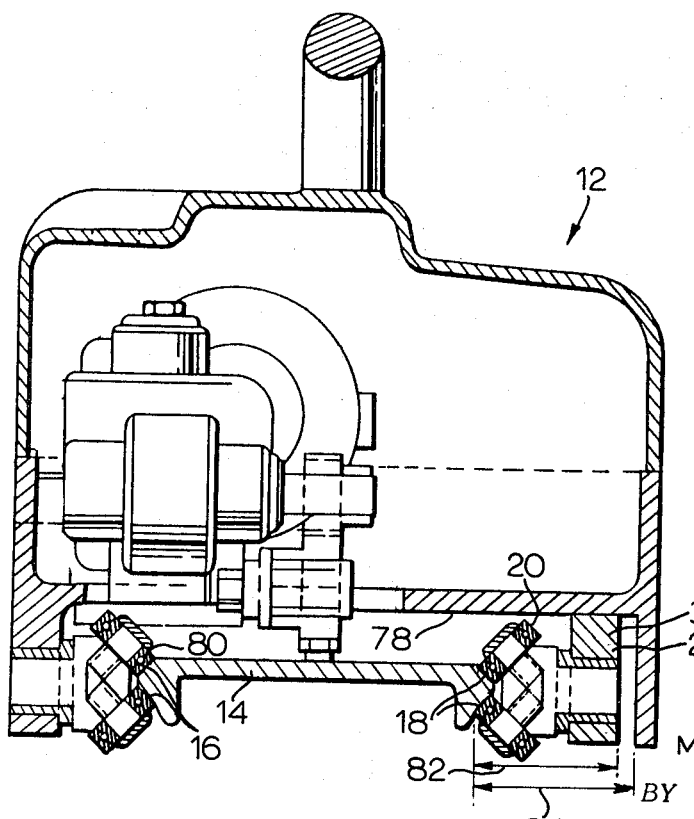
FIG. 5 is a cross-sectional representation substantially on the line 5—5 of FIG. 3 and showing the wheel or roller avancing and retracting assembly in advanced condition so that the associated carriage is shown locked rollably on to the track means.

The aforesaid restricting means 16 in the embodiment illustrated comprise the recess of V-conformation or otherwise best to be seen in FIG. 2 and the elongated complementary conformation similarly numbered 16 of FIGS. 4 and 5. Restricting means for confining the vehicle to the track means could of course reside in a variety of receding or projecting complementary configurations of and in co-operative relationship between a track means and wheel or roller pairs, or individual wheels or rollers.

The roller means 20 are preferably characterized by being in the form of a pair of swivelling rollers or roller assemblies 28 arranged in axially co-planar, axially angular relationship so as to present a recess 30 on the common axial plane of said pair and which recess is engaged by the elongated conformation already designated 16 on the opposite edges of track means 14.

The clamping assembly 10 includes a horizontally disposed beam generally designated 32, the roller assemblies 20 being attached to the opposite ends thereof. Beam 32 is rotatable clockwise and counter clockwise through a limited arc as indicated by the double-headed arrows 34 in FIG. 3 about the center of said beam which center is occupied by a vertical post 36 forming a component of said locking and releasing means 22. Beam 32 is rotatably mounted on post 36, the latter being provided with a screw-threaded aperture 38 at right angles to its vertical axis 40. Screw means 42 extend through aperture 38 to actuate post 36 transversely and thereby move beam 32 wholly sideways toward or away from the vehicle contacting portions 18 of track means 14.

Mounting assembly 24 includes guide means generally designated 44 for controlling the inward and outward movement of beam 32 to the linear at right angles to the direction of travel of vehicle or carriage 12 as indicated by the double-headed arrows 46.

Manually operable means 26 comprise the aforesaid screw means 42 and the turnpiece 48 as the main constituent parts of same. The screw means 42 are positioned for rotation without thrust in at least one rocker flange 50 of a laterally arranged parallel pair of the same on the flanks 52, the screw means extending inwardly from said flange through which the same projects as shown.

COMPLETE DESCRIPTION

The clamping assembly 10 is suitably located beneath and to one side of the vehicle such as 12. It may take the form of an accessory capable of being secured as by screw means to the vehicle although much to be preferred is a clamping assembly the mounting assembly 24 of which is integral with the vehicle as best shown in FIG. 1 where the pair of spaced and vertically dependent hangers 54 are cast en bloc with the vehicle 12. However, due to the possibility of the clamping assembly being in the form of an attachable accessory it should be explained that rocker flange 50 or at least the central portion thereof through which the screw means 42 extend, should be considered as part of the manually operable means 26. In fact it should be so considered in any event being essential for the rotation without thrust of the said screw means as will presently become more fully apparent.

Secured to the lower ends of the hangers 54 and bridging the space therebetween and the adjacent rocker flange 15 are stiffener and guide means in the form of a pair of spaced parallel transversely extending plates 56 and 58, the same being also secured to the edge of the flange 50.

Positioned within the volume of space bounded by the hangers 54 and the plates 56 and 58 is the aforesaid post 36, same being held non-rotatably at such location by means of the squared post-end portion 60 wherein the two parallel faces are held against rotation by the inner surfaces of plates 56 and 58.

Screw means 42 is rotatable by means of the manually operable means 26 already referred to, same taking such a form as a hexagonal head 62 through which passes a turnbar 64. To the inner side of the head 62 is secured an enlarged screw-threaded portion 66 to which is threadably connected the external nut 68. The nut bears against rocker flange 50 upon the external side thereof. Bearable rotatably against the inner surface of the rocker flange is a collar 70 through which and the shank or means 42 extends diametrically the locking pin 72. As a result it will be plainly apparent that the screw-threaded shank or means 42 may be rotated without any longitudinal movement. In doing so it carries the post 36 to right or left (with respect to FIG. 2) with it.

Beam 32 is centrally journalled on post 36 for the limited horizontal rotation illustrated and already referred to which is the reason for the provision of the enlarged apertures 74 and 76 upon either side of the post best to be seen in FIG. 2 and the former also in FIG. 1. The post extends between the undersurface 78 of the associated vehicle floor and the upper surface of the plates 56 and 58 but with sufficient tolerance to permit rotation thereof as indicated.

As already indicated the roller assemblies 20 are attached to the opposite ends of the beam 32 as shown. The same being free to swivel as the roller assemblies 80 projecting inwardly from the opposite side of the vehicle and which roller assemblies are incapable of lateral or transverse adjustment inwardly or outwardly.

From all the foregoing it will be apparent that, referring to FIG. 5, the described clamping assembly 10 which occupies the limits indicated by the double-headed arrow 82 of FIG. 5 is moveable within the limits indicated by the double-headed arrow 84 and in this connection it is to be added that, with reference to FIG. 2, the diameter of aperture 76 is such as will permit the portion of the collar 70 which is of smaller diameter and contains the locking element 72 to be accommodated therein so that the clamping assembly may be moved to the right so much the closer to the rocker flange 50.

The expression "rocker flange" has been chosen to describe the portion so designated due to its approximate correspondence with what are called the rockers of present day automobiles, same being the body work existing between the front and back wheels below the doors. Reference to "restricting means 16 for confining said vehicle to vehicle contacting portions of said track means" refers, in the particular structures herein illustrated to the outwardly V-d vehicle contacting portions of the track means in combination with the complementary recesses 30.

OPERATION

The vehicle 12 with clamping assembly 10 separated sufficiently from the roller assemblies 80 to straddle the track means 14 is placed upon said track means. The clamping means are now "locked on." In other words the element 64 is rotated so that the post 36 and beam 32 are advanced leftwardly with respect to the drawings until the rollers 20 make comfortable rolling contact with the surfaces 18. If the rollers 16 remain out of contact by being too far to the left, rotation of the element 64 is continued until they are drawn to the right under the influence of the pressure of the rollers 20 against the adjacent surfaces 18.

In view of the floating, or balanced or uniformly loaded condition which must, following the aforesaid activity exist as between all four of the rollers 20, four point contact exists as between all eight rollers and the adjacent track bearing surfaces regardless of any slight differences such for instance as those which have been referred to at the commencement of this specification in the said rollers or their associated parts. Also, it is to be noted at this point that if any roughnesses causing unwanted promontories exist in the surfaces 18 caused for example by rough treatment of the relatively soft alloy of which the same is made the rollers will negotiate same and yield thereto on account of their being pivotted to the post 36 via the beam 32.

When it is desired to unlock and remove the vehicle 12 from the track means 14, the element 64 is rotated in a reverse direction to permit the clamping assembly 10 to move to the right until the rollers are free of being intercepted by the outer extremities 18 of the track means 14.

Various modifications can be made within the scope of the inventive concept disclosed. Accordingly, it is intended that what is set forth herein should be regarded as illustrative of such concept and not for the purpose of limiting protection to any particular embodiment thereof, and that only such limitations should be placed upon the scope of protection to which the inventor hereof is entitled, as justice dictates.

What is claimed is:

1. A clamping assembly for use with the combination embodying (i) a vehicle, (ii) track means, (iii) restricting means for confining said vehicle to vehicle contacting portions of said track means, and (iv) transversely variable spacable wheel or roller means, said clamping assembly being characterized by comprising a two-point load-balancing roller-to-track locking and releasing means movable bodily toward or away from said contacting portions, a mounting assembly, manually operable means for moving said locking and releasing means twoard or away from said vehicle contacting portions while in said mounting assembly, said clamping assembly being attached to said vehicle, said wheel or roller means being swivellably connected to said locking and releasing means in substantially spaced relationship, and a pair of substantially spaced wheel or roller assemblies, each pair having two angularly related wheels or rollers, said locking and releasing means including a horizontally disposed beam, said wheel or roller assemblies being attached to the opposite ends of said beam.

2. The clamping assembly according to claim 1 in which said beam is pivotally connected substantially centrally thereof to said mounting assembly for limited rotation in a horizontal plane.

3. The wheel or roller assemblies according to claim 1 in which each assembly is characterized by being in the form of a pair of swivelling generally flat-tired rollers arranged in axially co-planar axially angular relationship so as to present a recess on the common axial plane of said pair, which recess is essentially of V-conformation so as to engage an elongated complementary conformation of the vehicle contacting portions of said track means.

4. The clamping assembly according to claim 3 in which said beam is pivotally connected substantially centrally thereof to said mounting assembly for limiting rotation in a horizontal plane.

5. The clamping assembly according to claim 3 in which said beam is wholly moveable sideways toward to away from said track means through the agency of said manually operable means.

6. The clamping assembly according to claim 3 in which said beam is also rotatable through a limited horizontal arc about its center point.

7. The invention according to claim 3 in which said manually operable means are in the form of screw means secured for rotation without thrust in at least one of a pair of rocker flanges on said vehicle, said screw means projecting inwardly from said rocker flanges, said locking and releasing means being threadably connected to said screw means for inward and outward movement upon manual operation of said screw means to lock said wheel or roller assemblies to said track means and release the same therefrom respectively, said beam lying essentially parallel to said rocker flanges upon the inner sides thereof.

8. The clamping assembly according to claim 1 in which said wheel or roller means are in the form of a pair of substantially spaced wheel or roller assemblies, said locking and releasing means including a horizontally disposed beam, said wheel or roller assemblies being attached to the opposite ends of said beam, said beam being moveable horizontally sideways toward or away from said track means vehicle contacting portions on actuation of said manually operable means, said beam being pivotally connected to said mounting means for limited rotation in a horizontal plane, said beam being so rotatable about substantially its center.

9. The locking and releasing means according to claim 8 in which said manually operable means are in the form of screw means secured for rotation without thrust in at least one of the rocker flanges of said vehicle and projecting inwardly therefrom, said locking and releasing means including a vertical post, said bean being rotatably mounted upon said post, said post being provided with a screw-threaded aperture at right angles to its vertical axis, said screw means extending through said screw-threaded aperture for causing inward and outward movement of said post and beam upon manual operation of said screw means and thereby rollably lock said wheel or roller assemblies to said track means or release the same therefrom respectively, said mounting assembly including guide means for controlling the inward and outward movement of said beam and post at right angles to the direction of travel of said carriage.

10. The clamping assembly according to claim 1 in which said wheel or roller means are in the form of a pair of substantially spaced wheel or roller assemblies, said locking and releasing means including a horizontally disposed beam, said wheel or roller assemblies being attached to the opposite ends of said beam, said beam being moveable horizontally sideways toward or away from said track means vehicle contacting portions on actuation of said manually operable means, said beam being pivotally connected to said mounting means for limited rotation in a horizontal plane, said beam being so rotatable about substantially its center.

11. The locking and releasing means according to claim 10 in which said manually operable means are in the form of screw means secured for rotation without thrust in at least one of the rocker flanges of said vehicle and projecting inwardly therefrom, said locking and releasing means including a vertical post, said beam being rotatably mounted upon said post, said post being provided with a screw-threaded aperture at right angles to its vertical axis, said screw means extending through said screw-threaded aperture for causing inward and outward movement of said post and beam upon manual operation of said screw means and thereby rollably lock said wheel or roller assemblies to said track means or release the same therefrom respectively, said mounting assembly including guide means for controlling the inward and outward movement of said beam and post at right angles to the direction of travel of said carriage.

12. The clamping assembly according to claim 1 in which said beam is wholly moveable sideways toward or away from said track means through the agency of said manually operable means.

13. The clamping assembly according to claim 12 in which said beam is also rotatable through a limited horizontal arc about its center point.

14. The locking and releasing means according to claim 1 in which said manually operable means are in the form of screw means secured for rotation without thrust in at least one of a pair of rocker flanges on said vehicle, said screw means projecting inwardly from said rocker flanges, said locking and releasing means being threadably connected to said screw means for inward and outward movement upon manual operation of said screw means to lock said wheel or roller assemblies to said track means and release the same therefrom respectively, said beam lying essentially parallel to said rocker flanges upon the inner sides thereof.

* * * * *